United States Patent [19]

Gladish

[11] Patent Number: 4,489,825
[45] Date of Patent: Dec. 25, 1984

[54] AIR FILM SUPPORTED AND GUIDED LOAD SUPPORT MEMBER

[75] Inventor: Herbert E. Gladish, Ottawa, Canada

[73] Assignee: E. B. Eddy Forest Products, Ltd., Ottawa, Canada

[21] Appl. No.: 947,435

[22] Filed: Oct. 2, 1978

[30] Foreign Application Priority Data

Oct. 19, 1977 [CA] Canada ................................. 288996

[51] Int. Cl.³ ..................... B65G 15/60; B61D 15/00; B60M 1/30; B65D 19/18
[52] U.S. Cl. ................................ 198/811; 104/23 FS; 104/290; 108/56.1; 198/619; 198/821; 198/823; 198/839; 248/188.1; 248/346; 248/632
[58] Field of Search ................... 108/51.1, 56.1, 56.3; 104/23 FS, 134, 148 LM, 290, 292; 406/86, 88, 92, 77; 198/839, 472, 619, 820, 821, 823, 811; 248/188.1, 346, 560, 575, 632, 634; 5/431, 434–442

[56] References Cited

U.S. PATENT DOCUMENTS

| | | | |
|---|---|---|---|
| 632,750 | 9/1899 | Ridgway | 198/821 |
| 756,600 | 4/1904 | Dodge | 198/811 |
| 1,664,537 | 4/1928 | Blankinship | 5/439 |
| 2,942,281 | 6/1960 | Cole | 5/442 X |
| 2,943,621 | 7/1960 | Phillips et al. | 5/434 X |
| 3,043,049 | 7/1962 | Gleason | 248/188.2 |
| 3,256,839 | 6/1966 | Peterson et al. | 108/56.1 |
| 3,378,948 | 4/1968 | Gervaise | 5/434 X |
| 3,625,157 | 12/1971 | Hart | 104/23 FS |
| 3,719,185 | 3/1973 | Hanes | 5/436 X |
| 3,734,271 | 5/1973 | Dolgolenko et al. | 198/811 |
| 3,835,952 | 9/1974 | Croix-Marie et al. | 104/23 FS X |
| 3,873,163 | 3/1975 | Gladish | 406/88 |
| 3,952,666 | 4/1976 | Gladish | 104/134 X |
| 4,062,301 | 12/1977 | Pitchford | 108/56.1 |
| 4,081,870 | 4/1978 | Iannucci | 5/434 X |

FOREIGN PATENT DOCUMENTS 420739 3/1967 Switzerland ....................... 248/632
1277194 6/1972 United Kingdom ................. 406/88

Primary Examiner—James L. Rowland
Attorney, Agent, or Firm—Peter L. Klempay

[57] ABSTRACT

A fluid levitated generally convex support member particularly useful in supporting a pallet, plate or belt such that the pallet, plate or belt load may be moved in an air powered track system, the system including at least one concave track with means for supporting and guiding the convex member and the pallet, plate or belt thereabove on a thin film of pressurized air jetting from nozzles in the track. The support member includes a generally tubular, flexible and partly deformable outer member and means for internally stressing the outer member so that under load there will be controlled deformation thereof. The deformed member will be closely complementary to the track surface to maximize load carrying capacity while minimizing fluid support power requirements and the detrimental effect of track deformities. Of particular significance is the ability of the support assembly covering to vibrate at high frequency at the track surface in response to the track jets and the wedge flow of the fluid support film to provide a pumping action which propagates and augments the pressure of the support film. Also, the small air film provides a controlled air gap which permits the use of electromagnetic propulsion means installed as part of the track for reaction with suitable secondary devices included in the support member. Under load removal there will be controlled recovery of the shape of the outer member. The support member exhibits excellent wear, cleanliness, cushioning, manufacturing, and select frequency response and damping characteristics.

14 Claims, 22 Drawing Figures

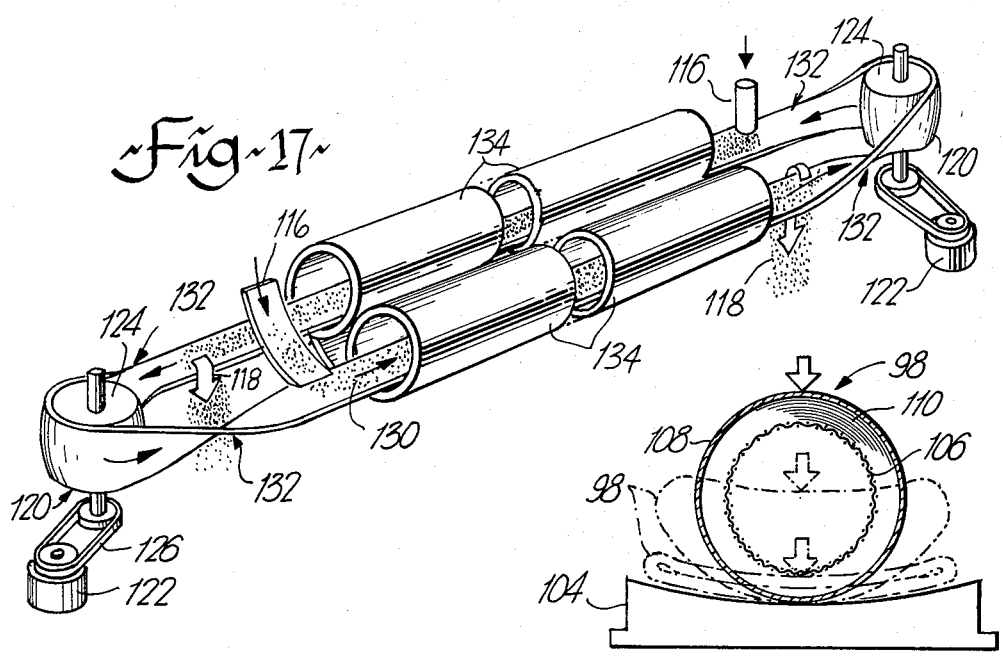
Fig-17
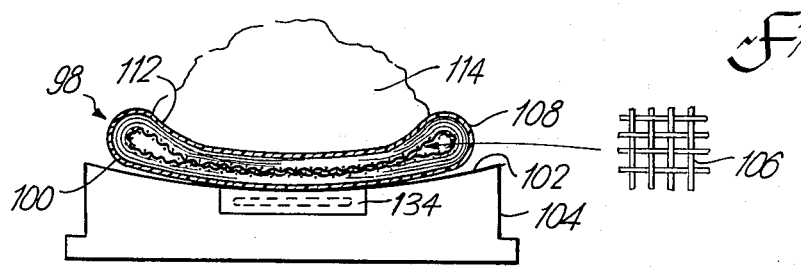
Fig-16a
Fig-16
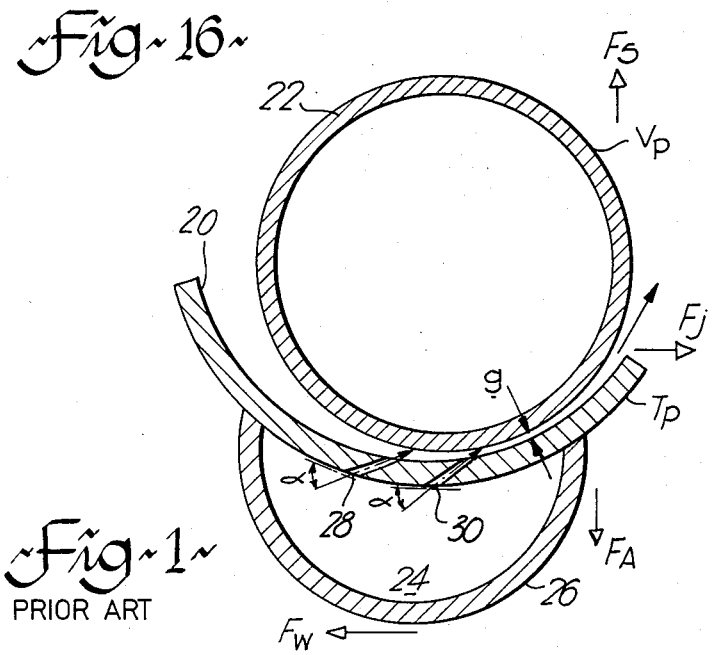
Fig-1
PRIOR ART

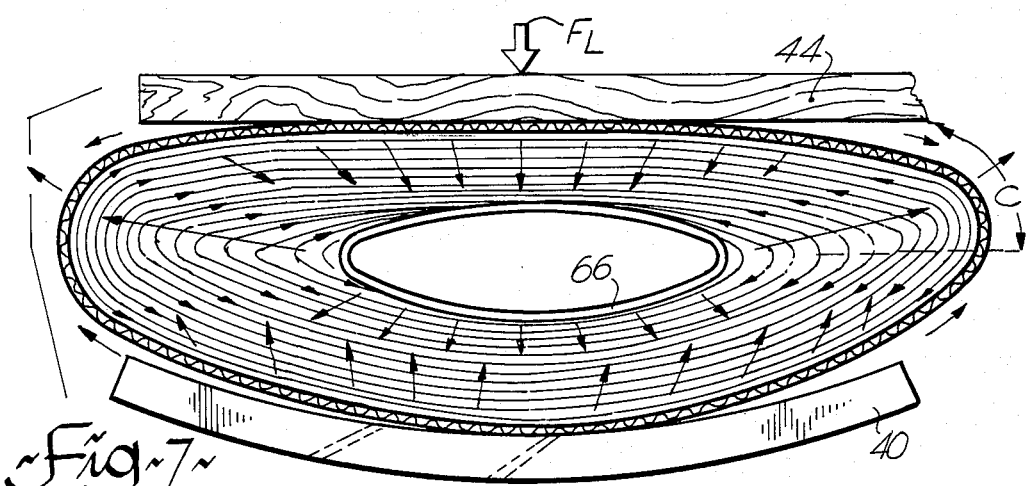
Fig-7-
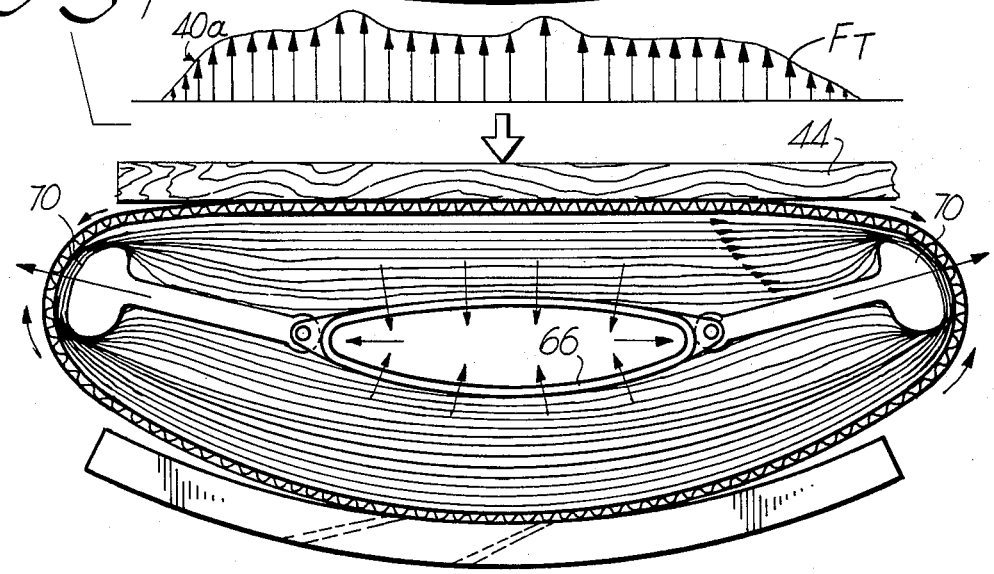
Fig-8-
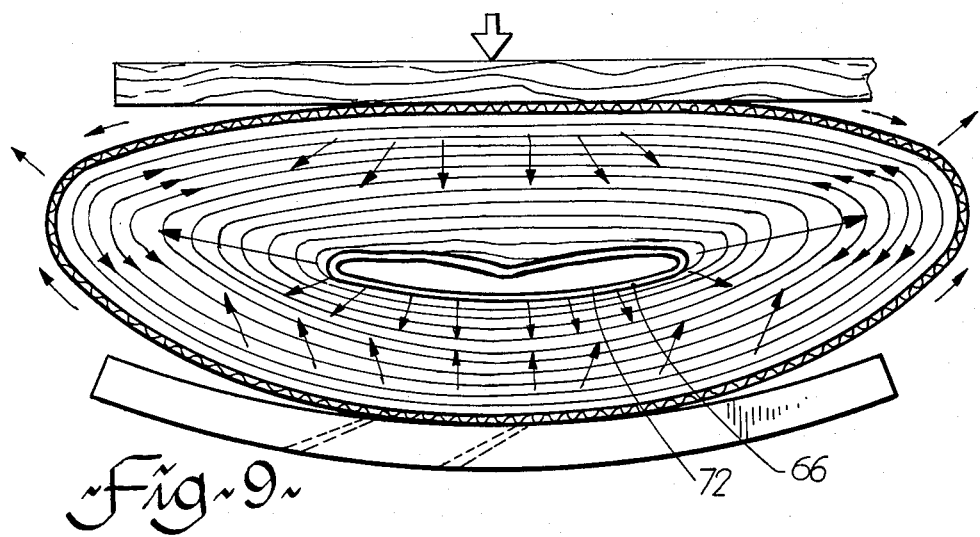
Fig-9-

AIR FILM SUPPORTED AND GUIDED LOAD SUPPORT MEMBER

The present invention relates in general to supports for articles moving on a conveyor and in particular to pallets, skids or plates and supports therefor.

BACKGROUND OF THE INVENTION

In Canadian Pat. No. 950,853 issued July 9, 1974 and assigned to a common assignee, an air conveyor was described and claimed, one embodiment of the conveyor utilizing a concave, trough-like track with a plurality of nozzles therein. The nozzles were asymmetrically positioned parallel to the center-line of the track and were directed at an angle to the center-line with respect to a tangent at the track surface. When an article to be conveyed, such as a roll of toilet tissue or a roll or paper towelling, was placed in the track and subjected to high velocity air flowing from the nozzles the article was displaced from a rest position coaxial with the track to a position slightly to one side of the center-line and was supported on the thin film of the issuing air which adhered to the curved track surface. In effect, the supporting air film formed a wedge of supporting fluid between the concave surface of the track and the convex surface of the supported article. The stability of this system has proven to be extremely good and the power requirement has proven to be very small.

Another Canadian patent (No. 1,002,565 issued Dec. 28, 1976 to the same inventor as in the previously identified patent) disclosed and claimed an up-scale version of the basic conveyor system, that invention being a vehicular transportation system using either one or two parallel tracks and a vehicle having appropriate mating support surfaces for support in or on the track(s).

In the first-identified patent mention was made of a conveyor system utilizing tracks laid in the floor of a factory with the supported article being a plate arrangement having a lower surface complementary to the track whereby commodities to be handled in the factory would be positioned on the uppermost surface of the plate and moved along the track in the factory floor to a new location, such as the loading dock. This concept is basic to a warehousing system and can be extended even beyond the warehouse to transport trailers, rail cars and aircraft that might carry the merchandise from the factory or warehouse to the distributor or to the eventual consumer.

This extension of the basic conveyor concept from the situation where the article positioned in the track is the actual product to the situation where the article positioned in the track supports the actual product requires considerations not previously deliberated upon in great detail. The product support could be a pallet or even a belt adapted to ride in the track. For example the question of stability suggests that a two-track conveyor is desirable for a pallet, as does the question of very heavy loads, weight distribution and power requirements to establish lift. A single track would be satisfactory for supporting a belt. Also durability and flexibility of the track and support should be considered as should the question of cushioning when the product is fragile.

The question of load shocks and cyclical or variable track support forces becomes more paramount when the concept of a warehouse converyor or distribution system is extended to the common carriers such as transport trailers. In many instances it would be desirable for a load, moving on an air supported pallet in the warehouse, to remain on the pallet and to pass directly, without the need of a fork-lift truck, into a waiting carrier. Once inside the carrier the pallet would rest on its supports which in turn would be restrained within the conveyor track with the air turned off. This situation makes it very desirable to isolate the cargo or load from the carrier body as much as possible, preferably through the cushioned pallet supports.

SUMMARY OF THE INVENTION

The present invention is intended to provide a pallet or belt support which can be utilized with an air conveyor such as that described in Canadian Pat. No. 950,853 and which will meet the requirements of load, cushioning, wear and economy dictated by a competitive and demanding industry.

Considerable experimentation with the durability and efficiency of prototype conveyor systems and load supporting arrangements has shown that it is possible to achieve the support of high loads at low power ratings with configurations that have been subjected to pallet loads of 3600 lbs. while being flexed at near resonant frequency (8cps) through 1.5 million cycles at $-51°$ without encountering any apparent incipient failure or deterioration. Such supports have also levitated a standard pallet load of 4 tons on a 60% open 10 foot track at a track horse power rating of only 1.8 hp. (equates to a track pressure of 32 psig.) A load of 2 tons on the other hand only requires about 0.5 hp. or a pressure of only 14 psig. on a 60% open 10 foot experimental track made from a standard pipe sector.

The above results were achieved with a pair of cylindrical (oblong) supports, each about 48 inches long and about $2\frac{1}{4}$ inches in height. Each was supported in a track of 6 inch radius having a few nozzles per foot of track, the nozzles being 0.030 inches in diameter and angled at 45 degrees to the track length and at 20 degrees to the track surface. Any internal nozzle clogging is precluded by low air mass flows and the upward direction of the flow thereof while high air velocities of the nozzle exit clear the outer portion of the nozzle and track. Each support in the test included an outer flexible yet strong covering formed of ultra high density polyethylene, a central spiral-wound deformable core made of a flexible, semi-rigid material such as paperboard, and between the covering and the core a light weight resilient material capable of compaction under load and recovery or rebound upon load removal. In fact, the core and resilient material used in the test were taken from a longer roll of uncut and unperforated creped paper tissue product.

A variation of the above invention is the use of a substitute support member of extended length comprising a relatively large diameter inner core of deformable material which could include wire mesh, wire loops or metal sheet with an outer resilient covering over a thin layer of compliant filler to form a reinforced flexible conveyor belt member to fit the concave air track section when compressed to a curved thin section under loading. This belt can be joined to form a continuous loop belt conveyor levitated on a thin film of supporting air and guided by the concave air track jet system. The belt can support various types of conveyed material loaded on its uppermost concave surface. The lower surface of the belt conforms with the curved track surface and can be made to vibrate in conjunction with the track air jet flows to propagate and augment the air film support. In this manner a conveyor belt with no rollers or idlers can convey various materials or loads with minimal friction, power and maintenance.

When the metal (collapsed) inner core is utilized as a secondary element for a linear elecromagnetic propulsion primary device included in the support track, the film supported belt forms a self-driven conveyor system of unique length and load carrying capabilities. The linear electromagnetic propulsion coils can be distributed over the entire length of the supporting fluid track, spaced to provide additional propulsion as required at various grade changes, even to brake or retard the belt load speed on downgrades as required by use of suitable motor characteristics. The absence of idlers, the use of a small belt section (due to drive distribution), and the use of one moving part with no lubrication make this type of conveyor especially useful in long distance conveying of say ore or chips with minimal power requirements and cost.

A similar construction utilizing metallic elements as the secondary for a linear electromagnetic propulsion primary device in the support track can be included in a pallet or plate support member as well.

Broadly speaking, therefore the present invention may be characterized as a load supporting means for positioning between a load and a load supporting surface, the means being capable of supporting the load and of substantially isolating the load from forces influencing the position of the supporting surface, the means comprising a generally tubular outer member formed of a flexible, partly deformable material and, internally of the member, means for peripherally prestressing the member.

BRIEF DESCRIPTION OF THE DRAWINGS

FIG. 1 shows a schematic cross-section of a conveyor system, similar to that of Canadian Pat. No. 950,853, illustrating the principle of support.

FIG. 5 shows a cross-section of the support shoe taken along the line 5—5 of FIG. 4a.

FIG. 7 shows a force diagram of the shoe.

FIGS. 8 to 12 show alternate ways of internally loading a support shoe, with FIG. 11 suggesting a means of varying the support shoe prestressing with variable loading.

FIG. 16 shows a transverse section of another embodiment of the present invention, with a load in place (same sheet as FIG. 1).

FIG. 16a shows a transverse section of the other embodiment before, during and after load application (same sheet as FIG. 1).

FIG. 17 shows an example of a conveyor system utilizing the other embodiment of the invention (same sheet as FIG. 1).

DESCRIPTION OF THE PREFERRED EMBODIMENT

Figure 2:
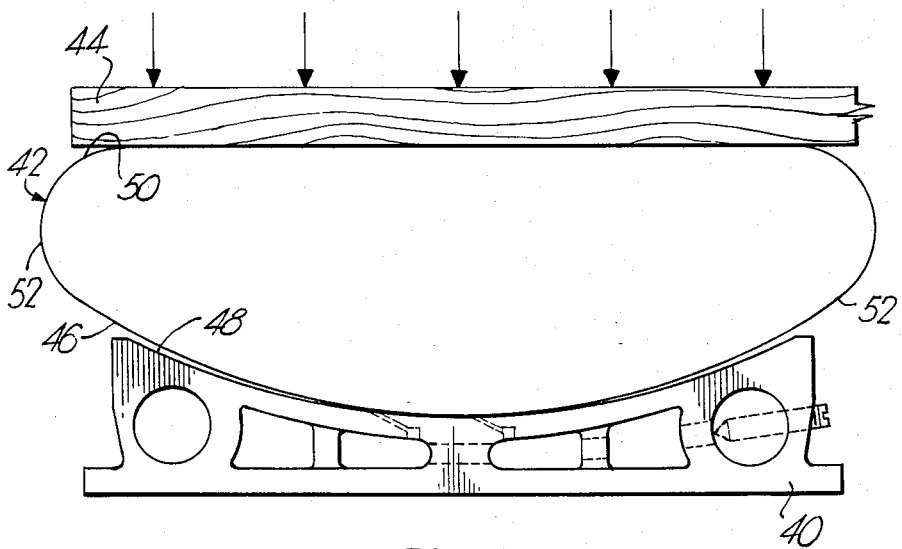
FIG. 2 shows an end view of a support in a track and under load.

Before describing the present invention in detail it is deemed advantageous to breifly discuss the principle of operation of a support system utilizing the present invention. This will be accomplished with reference to FIG. 1 which is a schematic, rather than detailed, representation of the support system.

Having regard to FIG. 1 it is seen that in its basic form a conveyor system may include a generally concave trough 20 which is intended to support a generally convex article 22. This article may be a cylindrical object intended to be transferred along the conveyor, it may be a belt as hereinafter described, or it may be a portion of a larger object, such as a pallet or skid. In the last case it is likely that a second conveyor or trough will be positioned beside and parallel to trough 20 and that the pallet will be supported by two articles 22, one for each trough 20.

Below the trough 20 is a plenum chamber 24 defined by plenum wall 26. Chamber 24 is provided with pressurized fluid such as air, at an optimum predetermined pressure. Sets of nozzles 28 and 30 are longitudinally and transversely spaced in the trough to communicate the plenum chamber 24 with the atmosphere. Jets 28 and 30 may be angled relative to the trough, it being noted that the sets of nozzles 28 and 30 may be asymmetrically positioned on opposite sides of the trough longitudinal center-line, a configuration which permits early generation of a fluid film support cushion and a generation of a pulsating pressure wave, to be hereinafter discussed.

The high velocity angled jets exiting from nozzles 28 and 30 of the concave surface in reaction with the proximity of the article 22 create a wedge-like film of pressurized fluid in the gap g formed between the article 22 and the track supporting surface. This film diminishes in thickness in the direction of projection of the jets, the jets exerting a force $F_j$ on the article tending to displace the article to the right as in FIG. 1. The force $F_j$ is balanced by the weight $F_A$ of the article 22 and by the wedge force $F_w$ due to the increased pressure created in the gap g as the article 22 tends to be displaced in the direction of projection of the jets. The weight supported is, of course, balanced by the vertical components $F_s$ of the wedge force and hence the article 22 may be held in stable equilibrium by the jet and the necessity for overt guiding beyond that attributable to the wedge phenomenon is redundant.

It is desirable that nozzles 28 and 30 exert a longitudinal force component on the article due to the increased loading capability with such an orientation. In addition, the longitudinal force components of the jets will exert an end force on the rear surface of the article thereby aiding in the propulsion thereof. Also the angled orientation will assist generally in cleaning the support surfaces of debris and other foreign particles. In addition, the high velocity of the uncovered jet is safely dissipated in conjunction with the so called "Coanda" effect of the free flow of the jet in close proximity to the track surface.

At the optimum design pressure the article 22 will be held in equilibrium slightly above the track and possibly slightly to one side of the longitudinal center-line. This equilibrium or stability condition is inherent to this fluid film support system. The jets exiting from the nozzles 30 fan out more or less symmetrically about their center-lines and within the trough configuration of the track in a typical free jet flow pattern to provide the greatest amount of fluid for levitation and guiding. The high velocity, possibly but not necessarily sonic, of the angled jets through interaction with the proximity of the support surface is transformed by an apparent free jet phenomena into a lower velocity high pressure fluid flow propagation over the curved support surface in a manner which resembles an air bearing gas film support, because in so doing, the flexible outer covering of the support member interacts with the fluid flow of the jet similar to the musical reed of a saxophone or clarinet instrument in which air is forced between the reed and the support surface in a wedge flow, to produce or create a high frequency vibration in the flexible member. This little known segment of gas bearing technology (sometimes described as "ultrasonic lubrication" or "High Frequency Induced Air Film Support") is utilized thusly to create a pulsation or pumping action in the fluid which increases the net positive supporting force of the film as well as to assist in the pressure propagation of the air film in the track-support interface. This support film pulsation also assists in the elimination of edge dragging or contact of the support covering with the track. In this instance as the film pressure profile between the support surfaces diminishes towards the track edges, the loading profile on the article is also made to diminish by virtue of the internal resilient material tension stresses. In addition, the high frequency pumping action of the vibrating support member covering provides an in-and-out oscillation of the film at the support edge to reduce chance of edge drag, and effectively provide a dynamic film or "moving in-and-out slug of fluid" seal, to reduce air escape and thus minimize air consumption.

The air mass flow of nozzles 28 will of course provide supporting forces by impact or impingement on the support member covering although these forces will probably be less than those of the film wedge for the instant the jet exists prior to transition by free jet into a pressure film.

As indicated above, the theoretical considerations respecting the support phenomena lead one into gas bearing technology, especially in view of the small gap g, between the article being supported and the support surface. In view of the configuration utilized in this support system it would initially appear that the configuration could be described as an "externally pressurized gas bearing" although further observations indicate that the principles of operation of a "squeeze film gas bearing" may also apply. In a squeeze-film bearing one of the surfaces is separated by a gas film when vibrated in a direction normal to its plane; the vibration process generates in the gas film asymmetric pressure pulses which, when averaged in time, transmit a new positive force tending to keep the surfaces separated. Such vibrations, even at an audible frequency have been observed in prototype configurations (about 2.2 Khz).

Insofar as the externally pressurized technology is concerned it is believed that the present configuration may be likened to a thrust or slider bearing wherein the gas is first squeezed and then allowed to expand with the inlet film thickness being greater than the outlet film thickness. This change in thickness may take the form of a wedge having its thickness diminishing in the direction of fluid flow, as in the present configuration.

Turning now to the present invention, in one embodiment the use of the above-described system for the support and conveying of pallets or skids necessitates the provision of a satisfactory interface between the load and its support. That interface is the pallet, or a simple plate, and the portion of the pallet which will be carried in the conveyor troughs. The pallet per se may take any shape or form as long as sufficient strength exists to carry the load between the supports. Many of the currently available pallets may be utilized. In most instances, the pallet will rest on a pair of support members, one for each longitudinal edge, each support member in turn resting or being supported and guided in a respective conveyor trough. In order to simplify the description, the conveyor trough and the support member will hereinafter be referred to as the "track" and "shoe" respectively.

The original air conveyor concept as described in Canadian Pat. No. 950,853 was developed for the conveying of rolls of toilet tissue or paper towelling. While such rolls will support a considerable load in radial compression they would not be satisfactory from a long term standpoint as shoes for a pallet conveying system. On the other hand, the resiliency and stress forces under load deformation exhibited by such rolls enhanced by reason of a creping process of the web, are desirable characteristics for a shoe. Hence a shoe exhibiting the load deforming resiliency characteristics of a roll of wound paper and having an outer resilient hermetically sealed covering of a tough durable and wearable material is seen to be a desirable and acceptable configuration. Such a material should be capable of vibrating somewhat under the influence of the air jets to promote the "squeeze film" phenomenon.

FIG. 2 shows an end view of a track 40 which carries a shoe 42 supporting a pallet 44 under load with a fluid pressure profile 40a (FIG. 7). It is seen that the lower surface portion 46 of the shoe has been deformed to where it essentially corresponds in curvature to the track surface 48. It is also seen that the upper surface portion 50 of the shoe is essentially flat. The surfaces 46 and 50 are connected by curved surface portions 52.

In order to create the most effective support it is desirable that the lower shoe portion 46 be stressed over the inner resilient portions of the shoe and core and be free to vibrate as well as to essentially correspond in curvature to the support surface 48. This will naturally occur under load, but it should also occur, although to a lesser extent, under no-load conditions. Accordingly, when there is no load imposed on the system the lower surface portion 46 should not differ appreciably in curvature from the track surface 48 except for any track irregularities. This suggests an outer stressed peripheral covering for the shoe as seen in FIG. 3 wherein the lower surface portion 46 has a smaller radius of curvature than the upper surface portion 50 although the upper surface portion is no longer essentially flat as when under load.

Figure 3:
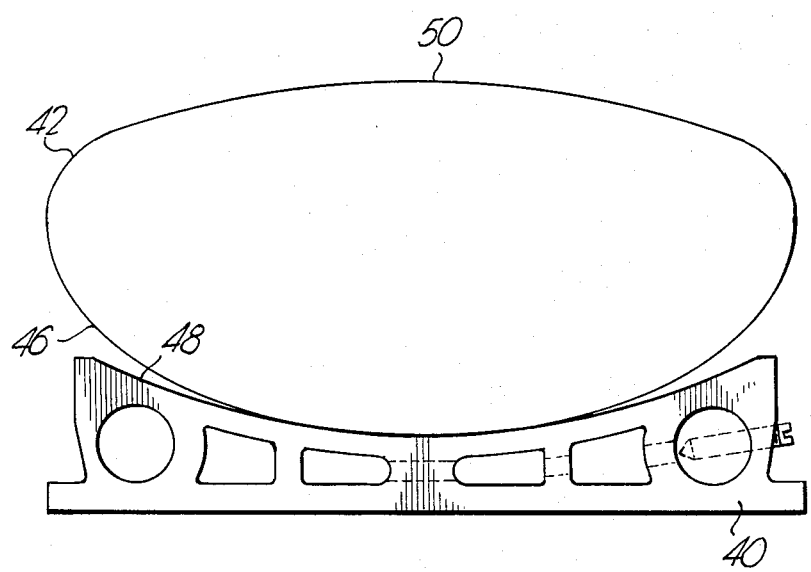
FIG. 3 shows the support of FIG. 2 with the load removed.

If the shoe 42 were to only utilize a wound paper web or sheet in a roll it would be necessary to deform the roll to the cross-sectional configuration shown in FIG. 3. It would be very difficult to maintain this configuration when in the noload condition or when the load is occasionally placed on a flat surface. To protect the web and its desirable stress properties, the wound web is encased in a thin but tough sheath of a resilient, semi-rigid yet deformable material which exhibits the desired properties of wear, toughness, economy, impermeability and stiffness and which further aids in producing vibrations created by the air flow from the jets. Materials such as ultra-high density (or cross-link) polyethylene, nylon, polyvinylchloride, polytetrafluorethylene and ABS are satisfactory. Even metal foils can be used but with less durability where random impacts, as from handling, may occur. The sheath or cover may be reinforced by various means, and maybe moulded, extruded or formed to the approximate desired cross-section and length by standard rotational, blow, or compression molding techniques as long as some provision for additional deformation or stressing under load is made, especially in the method of sealing the ends of the sheath.

Figure 4:
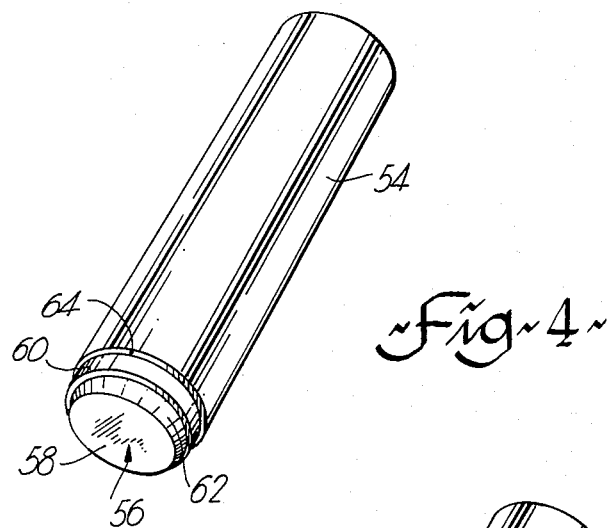
FIG. 4 shows a perspective view of a support shoe cover after moulding.
Figure 4A:
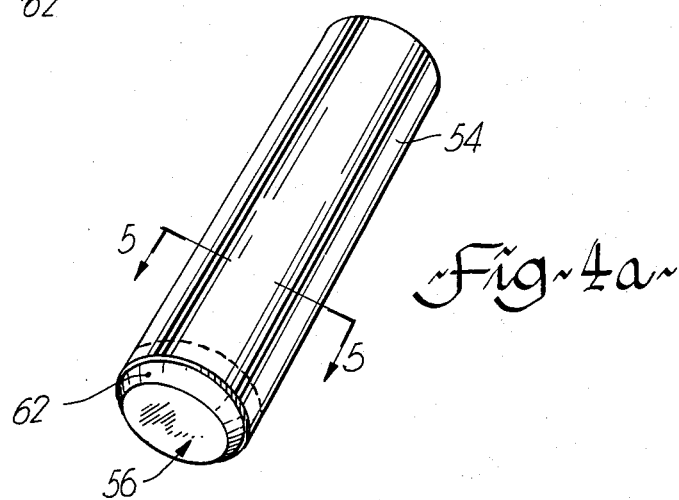
FIG. 4a shows a perspective view of a support shoe cover following removal of an end cap, insertion of a roll and replacement of the end cap.
Figure 5:
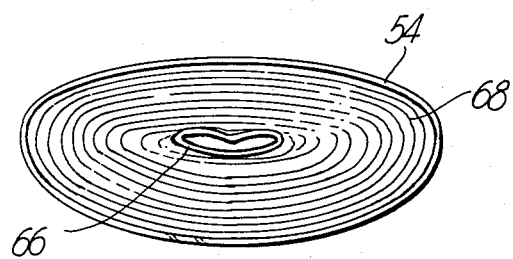

FIGS. 4 and 4a show perspective views of a suitable sheath 54 molded from one of the acceptable materials mentioned above. The length of the sheath corresponds to the length of the pallet to be supported thereby and to the peripheral shape as seen in FIG. 3. Since the entire support member should be hermetically sealed, the sheath may be moulded with front and rear end caps, FIG. 4 showing the front cap 56 only. Front cap 56 may include a truncated cone end face 58, a first peripheral ledge portion 60 and a second inwardly sloping ledge portion 62. There is a step 64 joining ledge portion 60 to the outer surface of the sheath, the step 64 having a height approximately equal to small debris thickness encountered on the track. End cap 56 may be removed from sheath 54 by cutting along the line of juncture between step 64 and ledge portion 60 to expose the interior of the sheath. Once exposed, a paper roll may be deformed to a cross-section corresponding to the interior cross-section and inserted into the interior. The severed end cap 56 may then be slid into the interior as well so that ledge portion 62 only is exposed. The end cap 56 may be sealed to the sheath 54 in any known manner as by bonding, welding or heat sealing. This is seen in FIG. 4a. FIG. 5 shows a cross-section of the completed shoe, including the outer cover or sheath 54, the inner generally coaxial core 66 and, between the core and the cover, the filler material 68 in the form of a prestressed web substantially filling the cavity formed between the cover and the core.

Figure 6C:
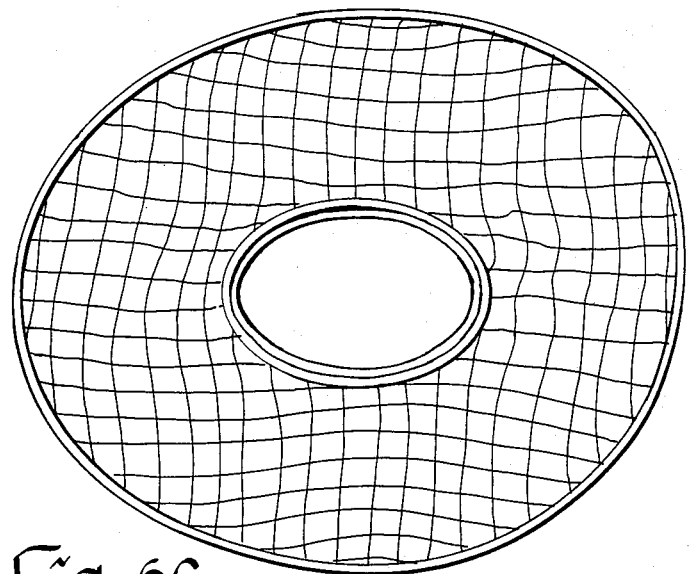
FIGS. 6A, 6B, and 6C, show cross-section of sample rolls illustrating the value of a core.
Figure 6B:
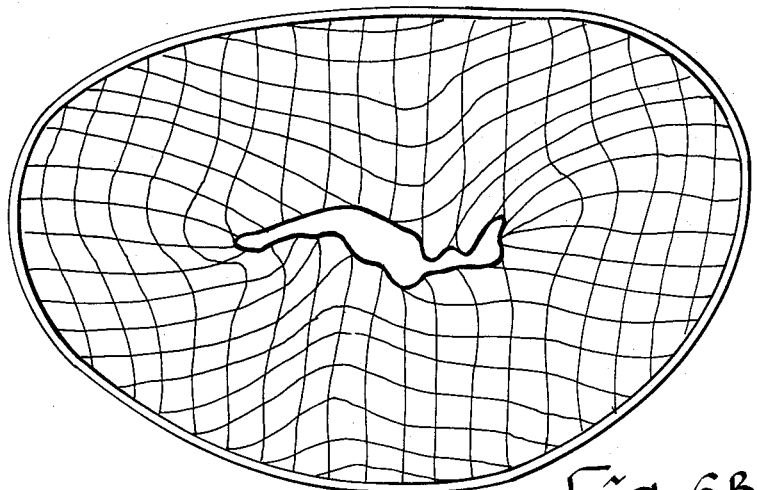
Figure 6A:
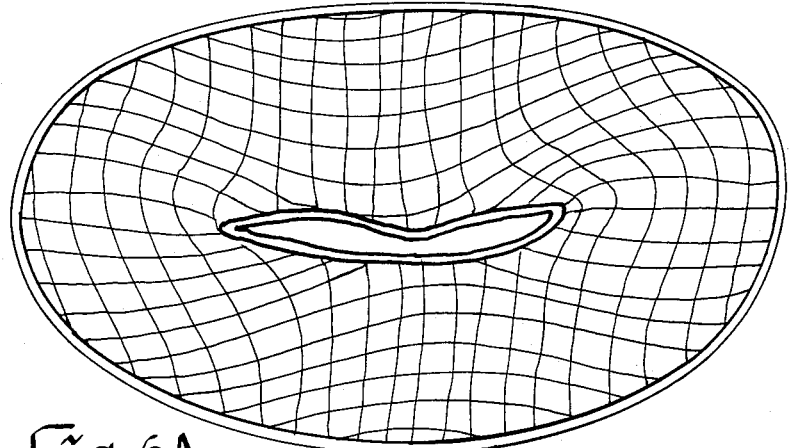

The desirability of a resilient yet semi-rigid core is illustrated in FIGS. 6A, 6B, and 6C which illustrate cross-sections of three actual test samples. Each sample was crosshatched to illustrate the lines and zones of stress and deformation. In FIG. 6A the core is a standard paperboard core as found in a roll of consumer tissue product. Under load the deformation is uniform although the core has collapsed upwards due to the influence of the track curvature. There is a degree of symmetry to the deformation and it is seen that restorative forces will be exerted in the vicinity of the deformed core edges when the load is removed. The shoe is firm with good springing and damping characteristics.

In FIG. 6B there is no core at all and it is seen that deformation is random with no lateral stability. This shoe was floppy and completely unsatisfactory.

In FIG. 6C the core was internally reinforced with a circular spring material. There was very little deformation and the shoe exhibited considerably increased spring stiffness and changed damping characteristics. On the basis of test results and observations the best effects are achieved with a simple cardboard core which exhibits considerable transverse strength when deformed, although under some circumstances reinforcement may be desirable if special characteristics of the shoe are desired. In special cases the shoe may be modified by including an insert such as a tube containing shock absorbing fluid or coolant with passage to an end cap reservoir. The fluid would operate through high friction or pressure loss orifices or check valve type orifices to assist circulation and to absorb shocks. Certain types of pressurized foam or other resilient material may be considered as long as they meet the above-mentioned general requirements.

To summarize to this point the present invention, in one embodiment, relates to a shoe for use in a track as part of an air conveyor or materials handling system, the shoe being intended to act as a support member for a pallet, skid or flat plate. The shoe, as seen in FIG. 5, comprises an outer cover of a resilient, strong, semi-rigid material having end caps and being capable of vertical deformation and vibration, a core of deformable material which is flexible when deformed in the narrow or vertical direction and is yet relatively stiff in the wide or horizontal direction and a filler material which can be pretensioned to provide a flexible yet resilient weight carrying component capable of recovery upon removal of a load from the shoe and capable of allowing the cover to be vibrated at high frequencies. One particular configuration of shoe which is very acceptable comprises a thin outer cover or sheath of very tough, slippery and resilient polyethylene, an annular core of paper-board defining an annular cavity between itself and the cover, and a web of one or two ply creped consumer paper product wound on the core under tension and substantially filling the cavity. The core and wound paper web may be produced as a separate entity and then positioned within the cover which is subsequently hermetically sealed via the end cap(s). The shoes contain fastening devices, such as moulded-in nuts which would facilitate the attachment to plates or pallets to form a skid structure without any loose pieces.

Some words on the wound web are also thought necessary. In order to achieve desirable resiliency characteristics the web should be creped from the paper machine Yankee roll during formation in order to achieve a degree of extendable prestressing or spring action of the individual cellulose fibres comprising the web. There should also be controlled tension imparted to the web and the elastic (creped) fibers as it is wound on the core. While mention has been made of a consumer product roll as exhibiting the desired characteristics, it should be understood that each roll would extend the full length of the shoe, normally without interruption, and that there would be no longitudinal perforations or any other discontinuities in the web, unless exceptional flexibility were desirable, or special resonant vibration frequencies were being sought.

FIG. 7 illustrates a force diagram for a loaded shoe, the shoe being constructed as described hereinabove. The shoe rests in a track 40 and receives a load on a flat pallet 44. The load forces are designated $F_L$ and the track reaction forces are $F_T$. With the load in place the wound layers of paper will be placed in compression in the zones above the core, in tension below the core 66 and in tension in the corner zones C which when deformed provide a somewhat structure arm effect. FIG.

7 also shows a fluid pressure profile 40a illustrating that supporting pressure is provided across the majority of track 40.

FIG. 8 illustrates an embodiment which enhances the force picture of FIG. 7, the core 66 having, along the two outer edges thereof, compression arms 70 pivotally connected thereto, the arms having longitudinally extending members connected thereto so as to prestress the wound web at the upper corners of the shoe. Such prestressing and the additional internal loading achieved under load aids the shoe's tensioned lower portion while providing certain friction between the wound webs and fibres to provide a shock absorber effect.

In FIG. 9 the same effect as that achieved in FIG. 8 is achieved with an oversized reinforcing arch 72 positioned within the core 66. The arch 72 is prestressed so as to exert the desired outward forces toward the zones C of FIG. 8.

Figure 10:
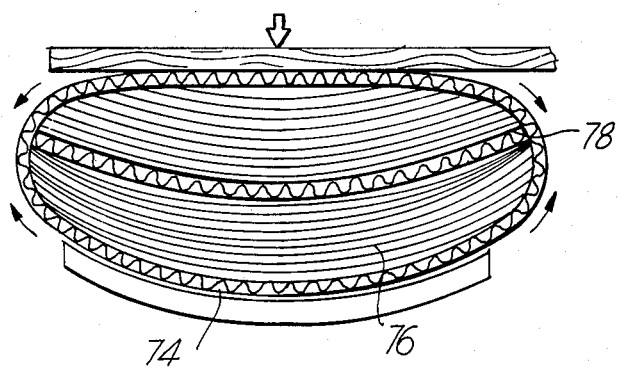

In FIG. 10 use is made of a corrugated web 76, which reduces substantially the amount of fiber used in the shoe, surrounded by a compliant cover 74, there being a reinforcing arch 78 positioned centrally of the shoe.

Figure 11:
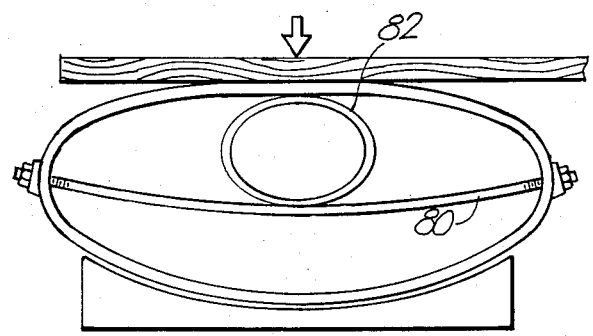
Figure 12:
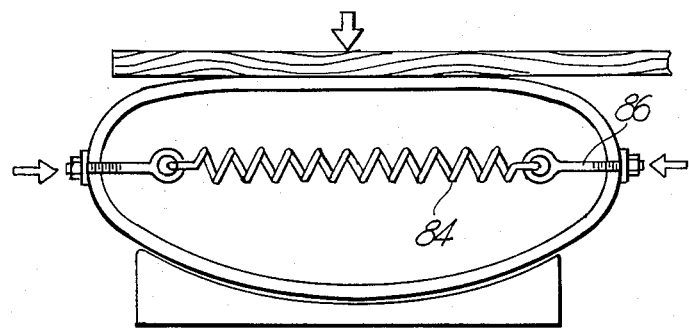

FIGS. 11 and 12 show basically mechanical shoes which utilize the stiffness of certain covering materials to deform the curvature under "arch compression" to achieve the desired prestressed resiliency of the outer cover without utilizing the central core and wound web. In FIG. 11 a tension cable 80 is strung between opposite sides of the cover 54 tending to squeeze the sides together so that when a load is applied the inward forces exerted by the load and the cable will force the lower portion of the cover to extend downwardly into conformance with the track surface. It is envisaged that cables might be spaced apart at intervals of say 6 inches over the length of the shoe. FIG. 11 also shows a tube or filler piece 82 which could apply additional tension to the cable and increase the tension even more upon load application.

The principle of FIG. 11 is achieved in the embodiment of FIG. 12 by utilizing a helical tension spring 84 connected at each end to a lug, such as an eye-bolt 86, fixed to the cover wall.

Figure 18:
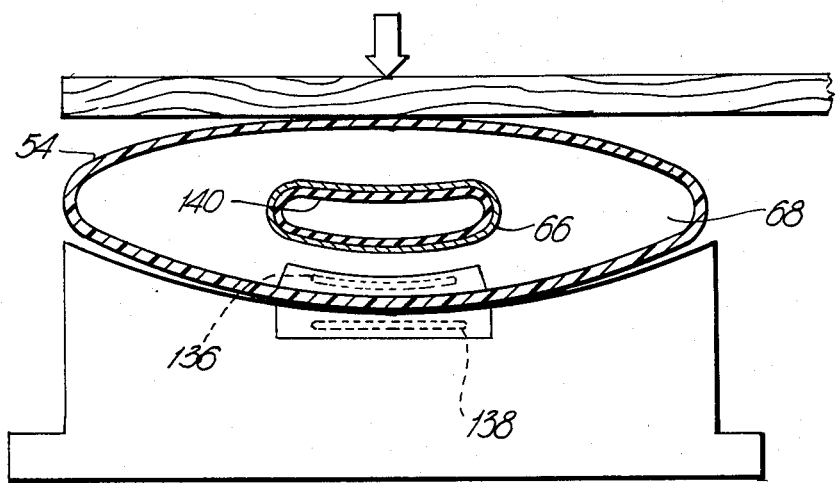
FIG. 18 is a schematic representation in partial cross-section of the present invention showing certain alternative constructions, each of which may be independent of or combined with other features of the invention.

It should be noted that while a filler material made of wound paper has been suggested as being acceptable for shoes in accordance with the present invention, it is conceivable that other filler materials exhibiting similar properties may also be effective. With reference to FIGS. 5 and 18 the filler material 68 could be a continuous web of corrugated paper board wound on the core 66 under tension. The filler material can also be a continuous web of extensible plastic film wound on the core 66. Furthermore, the filler material could be a formable monocellular plastic material which may be expandable to fill the cavity between the core 66 and the cover 54. Such materials are adequate, as long as they provide the desirable support flexibility, frequency response and dampening characteristics as required for the vibration of the cover in conjunction with the jet flows.

It has also been determined that the flexible nature of the shoe and support surface within limits greatly assists the ability of the support to accomodate certain track irregularities such as found with ordinary manufacturing or extrusion tolerances of standard pipe or relatively abrupt changes in track such as occur at track crossings or gaps. The compliant support surface also greatly improves the air film distribution between the track and the shoe for superior load carrying and power efficiencies.

The use of a linear motor coil embedded in the track or used as part of the track is very much enhanced in its thrust advantages when operated with the small air film gap of the support and track combination. In this instance, as in FIG. 18 secondary means 136 such as coils, loops or series of plates required to react with the primary linear motor component 138 in the track, are embedded or contained within the shoes in a manner so as not to greatly reduce the support action with the track. The vibration of the covering may be enhanced by the inherent vibrations of electro-magnetic forces of the linear motor. Indeed mechanical or electrical excitation to provide desirable support vibrations could be generated with the support system described.

It is also quite possible to include a fluid enclosed bladder 140 with optional orifice restrictions between adjacent longitudinal sections, within the central core, to provide additional damping of shocks or unwanted vibrations as may be experienced or to absorb certain heat production such as may be encountered with linear motor reactions.

Figure 15:
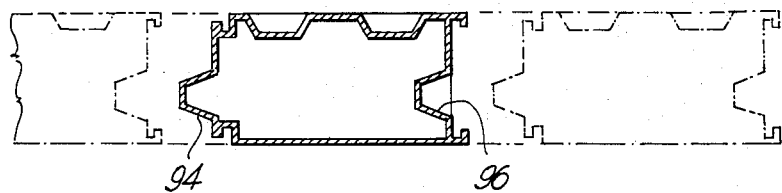
FIG. 15 shows a section along the line 15—15 of FIG. 13.
Figure 13:
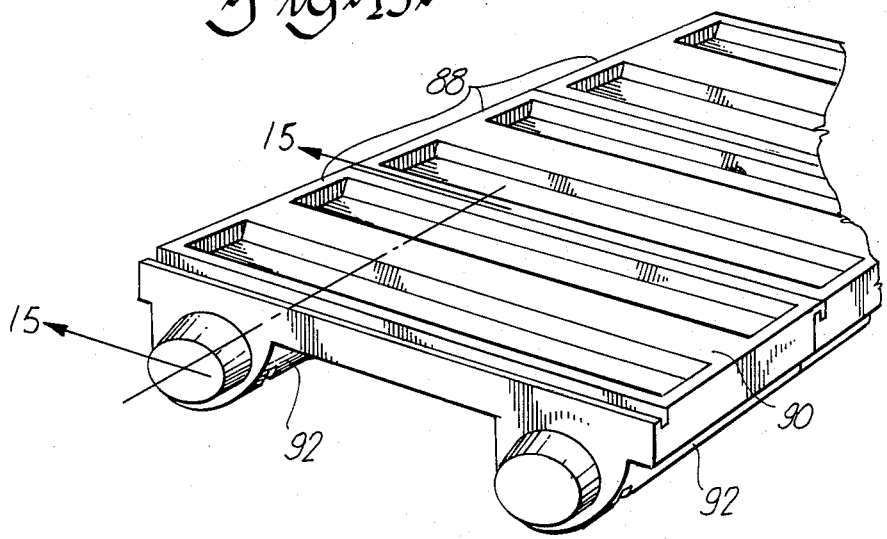
FIG. 13 shows a perspective view of a modular moldable pallet.
Figure 14:
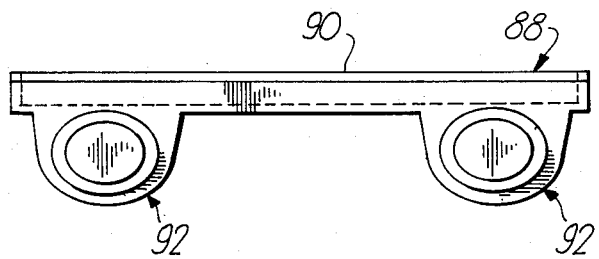
FIG. 14 shows an end view of the pallet of FIG. 13.

Turning now to FIGS. 13 to 15 a modular mouldable pallet incorporating shoes of the present invention is illustrated. Each module 88 includes a ribbed upper support surface 90 and a pair of shoes 92 extending along the length of the module and depending downwardly from the lower surface thereof. In keeping with the required properties of the outer shoe cover the entire pallet could be moulded from the same material. As shown in FIG. 15 each shoe would have a forwardly projecting cap 94 receivable in a corresponding recess 96 of another shoe on another module. Means could be provided for interlocking the modules in such a manner as to achieve limited articulation between adjacent modules to aid in traversing grade changes in the track. Needless to say the interior of each shoe 92 would contain a paper roll or other filler material in order to achieve the desired cushioning vibrating and support properties. Mechanical tie rods or strapping may be incorporated to further consolidate the modules.

FIGS. 16, 16a and 17 relate to a somewhat different configuration of the present invention, in both the track and the support. This is the system, mentioned earlier, wherein the load is supported on a belt which can be constructed in a manner similar to the first embodiment albeit with dimensional differences which are relevant to a belt situation.

As seen in FIG. 16, the belt 98 has a lower surface 100 which is essentially complementary with the upper surface 102 of the track 104, the track being similar to the track 40 of FIGS. 2 and 3. FIG. 16a shows how the belt can be formed, it being seen that the belt is first provided with an inner core 106 of deformable metal sheets, wire loops or thin wire mesh, an outer skin 108 of a flexible, deformable, semi-rigid material and between the inner core 106 and the outer skin 108 a flexible, deformable filler material 110. As seen in dotted lines in FIG. 16a the belt is initially formed with a circular cross-section and that it is steadily deformed through application of a downward force (arrow) until a lower surface 100 is brought into conformance with the track upper surface and an upper surface 112 is forced against the lower portion defining the lower surface 100. The result is the belt shown in FIG. 16, the belt having a concave upper surface 112 that can receive a load 114 such as wood chips. The materials used in the belt contribute to provide performance similar to the pallet system. It should be pointed out that the wire mesh core will hold the belt in its deformed shape and in turn will tend to tension or prestress the outer skin as required.

FIG. 17 shows only one example of a conveyor system utilizing a belt support formed in conformance with the present invention. Therein, a pair of side-by-side conveyor air tubes 134 are each provided with plenum means and air nozzles such that each can be considered to be a track having the same properties and function as the track 40 of FIGS. 2 and 3 with the exception that the track is enclosed rather than open. The air tubes extended from a loading point 116 to a drop-off or dump point 118. Spaced outwardly from each end of the tube is a drive assembly 120 including a motor 122, a barrel-shaped drive pulley 124 and means such as drive belt 126 connecting the motor to the pulley. An endless belt 130, formed in a manner as shown in FIGS. 16 and 16a is located in the air tubes (tracks) so as to support material on the concave upper surface thereof. The belt is also entrained about the drive pulleys 124, the barrel-shape thereof conforming to the concave upper surface of the belt. Since the pulleys 124 have a generally vertical axis of rotation the act of entraining the belt therearound will force the belt to twist through 90° at 4 zones 132. When the commodity carried by the belt is a loose material such as wood chips, the twisting action can also serve as the means for dumping the commodity from the belt. Thus in FIG. 17 the dump point 118 would essentially correspond with the twist zone 132. Needless to say the loading zone 116 would be positioned downstream of a twist zone to preclude any premature dumping of the commodity.

The belt conveyor system, can be modified in many ways. For example the return belt could also carry a commodity and the return belt need not parallel the first belt. Also if the pulleys 124 had their rotational axis horizonal the belt 130 could return on top of the air tube carrying the loaded belt, the upper portion of the air tube carrying a low pressure air plenum and nozzles to support the returning belt portion and thereby prevent damage thereto. Furthermore drive for the conveyor could take the form of an electromagnetic device such as a linear induction motor wherein the primary coils 134 are positioned in the track (FIG. 16) so as to interact with the metal core in the belt which then acts as the secondary. This configuration is made possible by the small gap between the belt and the track achieved during operation.

It is understood that deviations can be effected in the present inventin by people skilled in the art and the above description is not intended to cover each and every such possibility. The scope of protection afforded the present invention should be determined from the appended claims.

The embodiments of the invention in which an exclusive property or privilege is claimed are defined as follows:

1. A load supporting means for positioning between a load and a load supporting surface, said means being capable of supporting said load and of substantially isolating said load from forces influencing the position of said surface, said means comprising: a generally tubular outer member formed of a resilient partly deformable material capable of deformation under load and at least partial recovery under load removal; an annular deformable core extending generally axially within said outer member, creating an annular cavity between said core and said outer member; a resilient deformable filler material substantially filling said cavity and being capable of deformation under load and at least partial recovery under load removal, said filler material and said outer member being sufficiently flexible so that at least said outer member can vibrate under the influence of high velocity fluids exitting from nozzles in said surface; and including an axially extending, laterally flexible, reinforcing arch member positioned within said core and exerting lateral forces against the wall of said core under loading to assist in stress distribution within said filler material.

2. A load supporting means for positioning between a load and a load supporting surface, said means being capable of supporting said load and of substantially isolating said load from forces influencing the position of said surface, said means comprising: a generally tubular outer member formed of a resilient partly deformable material capable of deformation under load and at least partial recovery under load removal; an annular deformable core extending generally axially within said outer member, creating an annular cavity between said core and said outer member; a resilient deformable filler material substantially filling said cavity and being capable of deformation under load and at least partial recovery under load removal, said filler material and said outer member being sufficiently flexible so that at least said outer member can vibrate under the influence of high velocity fluids exitting from nozzles in said surface; and compression arm means pivotally mounted to the exterior of said core, extending laterally of said core and additionally prestressing said filler material.

3. A load supporting means for a pallet or skid, comprising: a generally tubular cover member formed of a resilient partly deformable material capable of deformation under load and at least partial recovery under load removal; a core extending generally axially in said member and creating an annular cavity within said member, said core being formed of a flexible, resilient deformable material; a resilient, extensible and compressible filler material substantially filling said cavity, said filler material being capable of deformation under load and recovery under load removal, said filler material and said outer member being sufficiently flexible that at least said outer member can vibrate under the influence of high velocity fluids exitting from nozzles in a support surface which can receive said load supporting means; and wherein said tubular core material and said filler material include a series of coil loops, plates, permanent magnets, or magnetic materials for interaction with an electromagnetic propulsion device within close proximity to a support track for said load supporting means.

4. A pallet or skid comprising a load supporting platform and platform support means attached to a lower surface of said platform, said support means including a generally tubular outer member formed of a resilient, partially deformable material, a core extending generally axially of said member creating an annular cavity within said member, said core being formed of a flexible resilient partially deformable material, and an extensible and compressible filler material substantially filling said cavity, said support means being capable of controlled deformation under load and recovery upon load removal.

5. The invention of claim 4 wherein said filler material comprises a continuous web of high bulk paper wound on said core under tension.

6. The invention of claim 4 wherein said filler material comprises a continuous web of extensible plastic film wound on said core under tension.

7. The invention of claim 4 wherein said filler material comprises a monocellular plastics material which is expanded within said cavity.

8. The invention of claim 4 wherein said filler material is a continuous web of corrugated paper board wound on said core under tension.

9. The invention of claim 4 wherein said tubular cover member is formed with deformable end caps which if cut off can be resealed to said member to provide a hermetically sealed support following insertion of said core and filler material.

10. The invention of claim 4 wherein said core is provided with a flexible tube or bladder sealed and filled with fluid to provide additional shock absorption, load carrying capacity and temperature control.

11. The invention of claim 4 wherein tubular cover material and said filler material includes a series of coil loops or plates for interaction with an electromagnetic propulsion device within close proximity to a support track for said load supporting means.

12. A modular pallet comprising a plurality of longitudinally interengagable pallet modules according to claim 4, each said pallet module having a support means adjacent each longitudinal edge with each tubular cover member thereof having a forward projection and a rear recess whereby the forward projections of one such module are receivable in the corresponding rear recesses of another such module, each module being provided with means for interlocking adjacent modules together.

13. The modular pallet of claim 12 wherein said platform and each said tubular member thereof are integrably moldable as a single unit.

14. The modular pallet of claim 12 wherein said platform is internally fitted with a series of coils, plates or magnets which interact with an electromagnetic propulsion device set between or close to a support track for said pallet.

* * * * *